United States Patent
Khakimov et al.

(10) Patent No.: US 10,623,505 B2
(45) Date of Patent: Apr. 14, 2020

(54) INTEGRATING SERVICE APPLIANCES WITHOUT SOURCE NETWORK ADDRESS TRANSLATION IN NETWORKS WITH LOGICAL OVERLAYS

(71) Applicant: Cisco Technology, Inc., San Jose, CA (US)

(72) Inventors: Elyor Khakimov, Santa Clara, CA (US); Shyam Kapadia, San Jose, CA (US); Richard Lam, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 95 days.

(21) Appl. No.: 15/661,445

(22) Filed: Jul. 27, 2017

(65) Prior Publication Data
US 2019/0037033 A1   Jan. 31, 2019

(51) Int. Cl.
*H04L 29/08* (2006.01)
*H04L 12/813* (2013.01)
(Continued)

(52) U.S. Cl.
CPC .............. *H04L 67/16* (2013.01); *H04L 12/44* (2013.01); *H04L 47/125* (2013.01); *H04L 47/20* (2013.01);
(Continued)

(58) Field of Classification Search
CPC ....... H04L 67/16; H04L 12/44; H04L 47/125; H04L 47/20; H04L 67/1008
(Continued)

(56) References Cited

U.S. PATENT DOCUMENTS 7,099,915 B1   8/2006   Tenereillo et al.
8,156,504 B2   4/2012   Sukirya
(Continued)

OTHER PUBLICATIONS

Citrix Systems, Inc., "Deliver the Next-Generation Intelligent Data Center with Cisco Nexus 7000 Series Switches, Citrix NetScaler Application Delivery Controller, and RISE Technology", C11-731370-00, Mar. 2014, 8 pages.
(Continued)

*Primary Examiner* — Meng Vang
(74) *Attorney, Agent, or Firm* — Edell, Shaprio & Finnan, LLC

(57) ABSTRACT

A network controller for a network implementing a virtual network overlay determines a network gateway via which a service appliance accesses the network. The network controller determines a network gateway via which an application server accesses the network. First policy data is distributed to the network gateway via which the service appliance accesses the network. This first policy data indicates that the network gateway via which the service appliance accesses the network forwards return packets addressed to a client device sent from an application server to the service appliance. Second policy data is distributed to the network gateway via which the application server accesses the network. This second policy data indicates the network gateway via which the application server accesses the network is configured to forward return packets addressed to the client device to the network gateway via which the service appliance accesses the network.

20 Claims, 6 Drawing Sheets

(51) Int. Cl.
*H04L 12/44* (2006.01)
*H04L 12/803* (2013.01)
*H04L 29/12* (2006.01)

(52) U.S. Cl.
CPC ............ *H04L 61/256* (2013.01); *H04L 67/02* (2013.01); *H04L 67/1008* (2013.01); *H04L 61/2514* (2013.01); *H04L 61/2521* (2013.01); *H04L 61/2564* (2013.01); *H04L 67/22* (2013.01)

(58) Field of Classification Search
USPC ......................................................... 709/223
See application file for complete search history.

(56) References Cited

U.S. PATENT DOCUMENTS

| | | | |
|---|---|---|---|
| 2011/0173324 A1* | 7/2011 | Wang | H04L 67/02 709/225 |
| 2012/0066371 A1 | 3/2012 | Patel et al. | |
| 2012/0281540 A1* | 11/2012 | Khan | H04L 45/308 370/241 |
| 2013/0250951 A1* | 9/2013 | Koganti | H04L 49/356 370/390 |
| 2014/0207968 A1 | 7/2014 | Kumar et al. | |
| 2014/0269709 A1* | 9/2014 | Benny | H04L 45/64 370/392 |
| 2014/0307744 A1* | 10/2014 | Dunbar | H04L 45/44 370/401 |
| 2015/0172172 A1* | 6/2015 | DeCusatis | H04L 12/44 370/219 |
| 2017/0331711 A1* | 11/2017 | Duda | H04L 41/0631 |

OTHER PUBLICATIONS

Peter Havrila, "Basic Load-Balancer Scenarios Explained", Dec. 2, 2011, https://networkgeekstuff.com/networking/basic-load-balancer-scenarios-explained/, 4 pages.

* cited by examiner

200

205 { ip access-list ACL-WS-REDIR 10 permit tcp 192.168.10.0/24 eq www any

210 { route-map WS-REDIR-1 permit 10 match ip address ACL-WS-REDIR set ip next-hop 100.100.100.100

215 {
! ! apply route-map on the SVI default gateway of the web servers ! !
interface Vlan505 ip policy route-map WS-REDIR-1
! ! apply route-map on the fabric facing core 220 { interface SVI ! !
interface Vlan2500 ip policy route-map WS-REDIR-1

INTEGRATING SERVICE APPLIANCES WITHOUT SOURCE NETWORK ADDRESS TRANSLATION IN NETWORKS WITH LOGICAL OVERLAYS

TECHNICAL FIELD

The present disclosure relates to packet forwarding in networks with logical overlays.

BACKGROUND

Application load balancers may be integrated into a network, such as a fabric network, using a wide variety of deployment modes. These deployment modes include one-arm routed modes, two-arm routed modes, inline routed modes, inline bridged modes, and others. Regardless of the application load balancer deployment method, an important property of the resulting deployment is the ability to retain end-user transparency at the application server nodes. The visibility is important for certain applications, such as financial and banking applications, which are mandated to retain traces and logs of every client transaction for compliance purposes.

Computer networking has evolved to take advantage of control-plane based end-host reachability information, which allows for large scale, robust and highly available networks. Such networks may be built using logical or virtual overlay technologies and encapsulation technologies, such as FabricPath or Virtual Extensible Local Area Networks (VXLAN). Traditional methods for steering data traffic in these newer fabric network technologies may not be easily scalable or techniques for packet steering may limit some of the benefits of newer control-plane based fabric networks. This is especially true in the presence of a distributed Internet Protocol (IP) anycast gateway where the leaf or Top of Rack (ToR) switches host the Open Systems Interconnection (OSI) Layer 3 gateway for all the workloads below them.

BRIEF DESCRIPTION OF THE DRAWINGS

FIG. 2 illustrates an example configuration of a network gateway device in a network implementing a logical or virtual overlay that integrates service appliances without source network address translation, according to an example embodiment.

DESCRIPTION OF EXAMPLE EMBODIMENTS

Overview

A network controller for a network implementing a virtual network overlay determines a network gateway via which a service appliance accesses the network. The network controller determines a network gateway via which an application server accesses the network. The network controller distributes first policy data to the network gateway via which the service appliance accesses the network. This first policy data indicates a network policy such that when the policy is executed, the network gateway via which the service appliance accesses the network is configured to forward return packets addressed to a client device sent from an application server to the service appliance. The network controller distributes second policy data to the network gateway via which the application server accesses the network. This second policy data indicates a network policy such that when the policy is executed, the network gateway via which the application server accesses the network is configured to forward return packets addressed to the client device sent from the application server to the network gateway via which the service appliance accesses the network.

Example Embodiments

Figure 1:
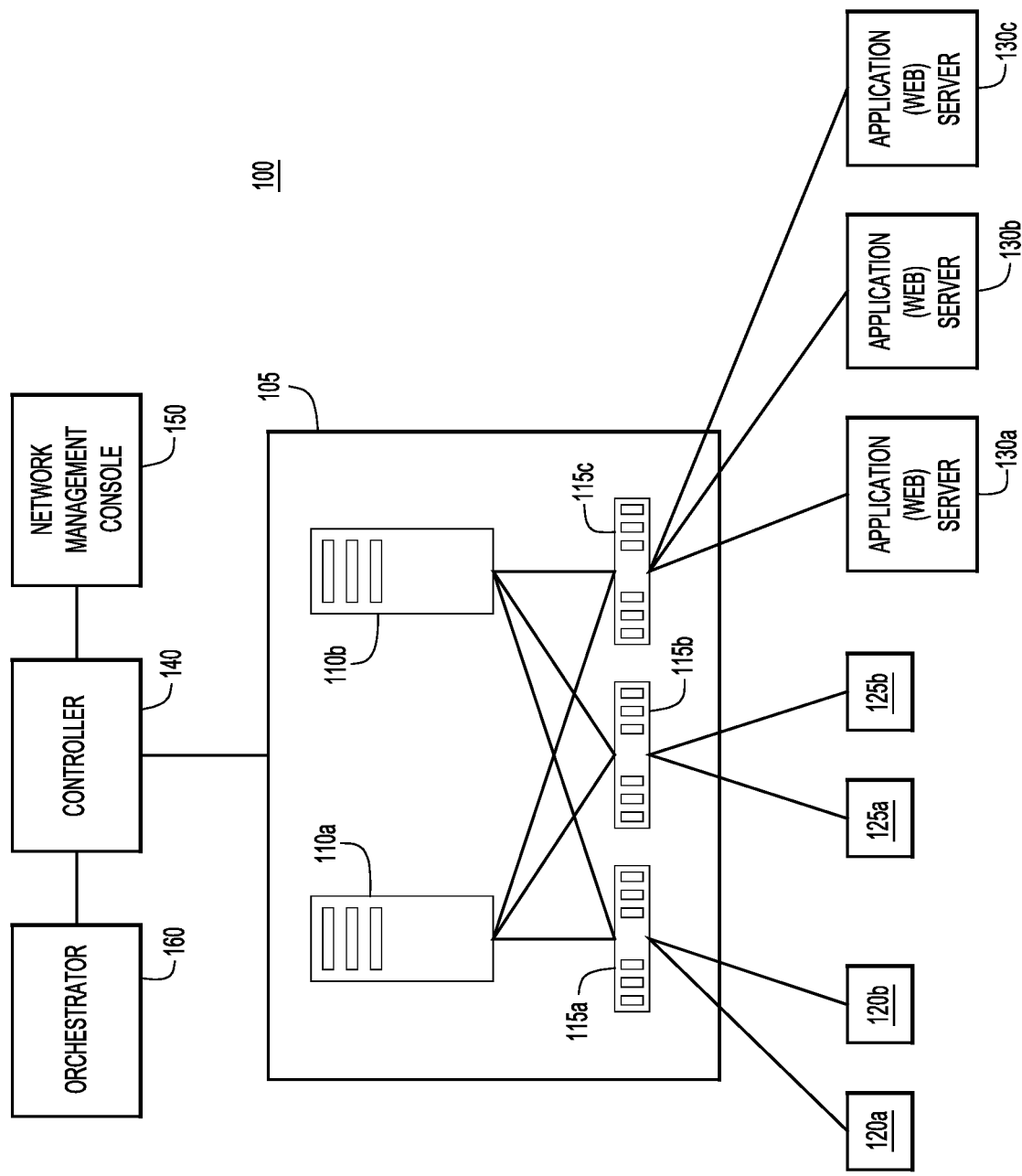
FIG. 1 illustrates a first example network environment implementing a logical or virtual overlay that integrates service appliances without source network address translation, according to an example embodiment.

With reference made to FIG. 1, depicted therein is a network environment 100 configured to integrate a service appliance or appliances, such as load balancers, firewalls, intrusion protection services, etc., into a network that implements a logical overlay technology while providing stateful services via the service appliance or appliances without Source Network Address Translation (SNAT). Network 100 is further configured such that client information, such as a client source address, remains visible to the application servers that provide application services to client devices via the network.

Network environment 100 includes a physical network 105 that is configured to provide network services to one or more tenants through a logical or virtual overlay technology. Specifically, logical or virtual overlay technologies, such as Virtual Extensible Local Area Network (VXLAN) of FabricPath technologies, may implement packet encapsulation to provide network segmentation between different tenants using the same physical network. Such encapsulation may be used to designate and also secure packets from different tenants, allowing physical network 105 to provide segmented services to multiple tenants using the same physical devices. For example, packets from a first tenant may be encapsulated using a header that provides values identifying those packets as belonging to the first tenant. The payload of the packets belonging to the first tenant may be encrypted such that the payloads may only be decrypted by the devices associated with the first tenant. Similarly, packets associated with a second tenant will receive their own encapsulation and/or encryption specific to the second tenant.

According to the example embodiment for FIG. 1, physical network 105 is constructed as a programmable fabric network with spine switches 110*a* and 110*b* and leaf switches 115*a-c* making up the physical components of network 105. Leaf switches 115*a-c* serve as gateways into network 105, with spine switches 110*a* and 110*b* providing interconnections between leaf switches 115*a-c*.

Leaf switches 115*a-c* serve as gateways that allow devices to access the physical network 105. These devices include client devices 120a and 120b, service appliances 125a and 125b and application servers 130a-130c. While FIG. 1 illustrates all of the client devices 120a and 120b accessing network 105 through the same leaf switch 115a, all of the service appliances 125a and 125b accessing network 105 through leaf switch 115b, and all of the application servers 130a-c accessing network 105 through leaf switch 115c, the gateway through which each type of network element accesses network 105 may be distributed over numerous leaf switches, with different types of devices accessing network 105 through the same leaf switch.

As noted above, service appliances 125a and 125b apply stateful services to connections between client devices 120a and 120b and one or more of application servers 130a-c. For example, if service appliance 125a is embodied as a load balancer, it will track the state of connections between one or more of client device 120a and 120b and application servers 130a-c, which means traffic flowing between client devices 120a and 120b and application servers 130a-c flows through load balancer 125a in both the request direction (i.e., packets sent from a client device to an application server) and the response direction (i.e., packets sent from an application server to a client device). Additionally, because gateway 115b serves as the gateway for access to the stateful service appliances 125a and 125b, gateway 115b also needs to provide this access via the overlay interface (i.e., the core-facing interface) thereby ensuring that both client devices 120a and 120b and application servers 130a-c connected to different switches can also reach these appliances. This functionality may be realized using an appropriate switched virtual interface (SVI) or bridge domain interface (BDI).

For example, if application servers 130a-c are embodied as web servers hosting a particular web page, a client device 120a may make a request for that page. Due to the logical overlay implemented in network 105, a single virtual address (typically called a "Virtual IP address" or "VIP") is used by web servers 130a-c, with service appliance 125a serving as a load balancer that splits requests between web servers 130a-c. Accordingly, the request from client device 120a may take the form of a packet addressed to the virtual address associated with all of web servers 130a-c. This virtual address causes the traffic to be sent to load balancing service appliance 125a, which translates the virtual address to the physical address (i.e., the real or actual address) specific to one of web servers 130a-c dependent on the current workloads associated with the two web servers. According to this specific example, it is assumed that load balancing service appliance 125a determines that the request should be forwarded to web server 130b. Therefore, load balancing service appliance 125a replaces the virtual destination address in the request packet with the physical address (i.e., the real or actual address) that is specific to web server 130b.

Because the service applied by load balancing service appliance 125a is stateful, the response traffic from web server 130b should also pass through load balancing service appliance 125a. One way to ensure this is to perform SNAT on the request packet, translating the source address from the request to indicate the address for service appliance 125a. This may introduce problems as sometimes the response from web server 130b should be tailored to the particular client device from which the request was received. If the source address for the request is altered, the web server 130b may not be able to prepare and send the appropriate response to the request. For example, if the request is for a particular web page, some content on the web page, such as advertising associated with the web page, may be tailored to the source of the request. If web server 130b receives a request that indicates service appliance 125a as the source of the request, it may be unable to generate the appropriate content for client device 120a. According to other examples, web server 130b may be required to track activity based upon the source of the request. For example, certain financial web sites, such as online banking sites, are required to track the source of client activity for compliance purposes. If the source address of client device 120a is replaced by the address for service appliance 125a, web server 130b may not be able track this user activity as required.

On the other hand, if the source address is kept as the address for client device 120a, the response traffic will be forwarded directly to client device 120a without passing again through load balancing service appliance 125a. This may introduce additional problems. If the traffic does not pass through load balancing service appliance 125a, load balancing service appliance 125a may not be able to maintain the state of the connection between client device 120a and webserver 130b. Similarly, client device 120a may not be able to determine which request is associated with the response. Specifically, client device 120a sent a request to the virtual address associated with all of web servers 130a-c. The response will be received at client device 120a with a source address which is the physical address of web server 130b. Accordingly, client device 120a may not be able to associate the response received from the physical address of web server 130b with the request sent to the virtual address shared by web servers 130a-c.

One approach to solve the above-described problems is to provide a single gateway through which all client devices for a particular tenant access network 105. This solution has the drawback of eliminating the flexibility and scalability of a distributed gateway. Another approach would be to configure the web server 130b with the virtual address associated therewith, and have web server 130b alter the source of address of its response packets with its virtual address. This solution has the drawback of requiring configuration of the webserver by the tenant.

The concepts of the present disclosure leverage a controller 140, such as a Software Defined Network (SDN) controller, to configure and distribute (i.e., "push") Policy Based Routing (PBR) policies to the appropriate devices to ensure that both request and response traffic traverses a service appliance in a network with a distributed gateway, such as network 105 of FIG. 1. Specifically, controller 140 automatically crafts the PBR policies and configures leaf switches 115a-c where appropriate. Controller 140 distributes policy data that allows the recipients to generate polices to any of leaf switches 115a-c which serve as gateways for stateful service appliances 125a and 125b. Controller 140 also distributes polices, or data that allows the recipients to generate polices, to any of leaf switches 115a-c which serve as gateways for application servers 130a-c. The polices implemented by leaf switches serving as gateways for the stateful service appliances 125a and 125b are configured to cause the leaf switches to forward response packets sent from application servers 130a-c and addressed to one or more client devices 120a and 120b to a service appliance. The policies distributed to leaf switches 115a-c causes the leaf switches (switch 115c in this case) to forward packets received from application servers 130a-c that are addressed to one of client devices 120a and 120b, to leaf switch 115b that serves as a gateway for a stateful service appliance 125a or 125b. Such policies permit the client identity to be maintained throughout the transactions between the client devices 120*a* and 120*b* and application servers 130*a-c* while ensuring that both request and response packets traverse the stateful service appliances 125*a* and 125*b* in both the request and response directions.

For example, client device 120*a* sends a request packet addressed to the virtual address shared by web servers 130*a-c*. This request packet is received at leaf switch 115*a*, which serves as one of the gateways of the distributed gateway utilized in the logical overlay associated with the tenant to which client device 120*a* belongs. Leaf switch 115*a* forwards the request packet to leaf switch 115*b* according to routing policies contained in leaf switch 115*a* that direct all packets with this virtual destination address to load balancing service appliance 125*a*. Load balancing service appliance 125*a* selects one of web servers 130*a-c*, in this case web server 130*b*, and translates the destination address in the request packet from the logical address shared by web servers 130*a-c* to the physical address specific to web server 130*b*. Because of the policies described above (and to be described in further detail below), load balancing appliance 125*a* may not translate the source address from that of client 120*a* to that of load balancing appliance 125*a*. Specifically, polices distributed to leaf switch 115*c* will ensure that response packets sent from web server 130*b* will be forwarded to leaf switch 115*b* regardless of the destination address contained in the response packet. The request packet is then forwarded by load balancing service appliance 125*a* to web server 130*b* via network 105. Load balancing service appliance 125*a* may also store data for the connection to be formed between client device 120*a* and web server 130*b* in order to provide stateful services for the connection. For example, load balancing service appliance 125*a* may update a flow table for the connection between client device 120*a* and webserver 130*b*.

Upon receipt at leaf switch 115*c*, the request packet is forwarded to web server 130*b* due to the address translation provided by load balancing service appliance 125*a*. Web server 130*b* processes the request packet and prepares a response packet. Because the source address of the request packet was not translated by service appliance 125*a*, the contents of the response packet may be tailored to the identity of client device 120*a*. Specifically, because the source address of the request packet is received at web server 130*b* with the address for client device 120*a*, web server 130*b* may identify client device 120*a* as the source of the request. Accordingly, the response provided by web server 130*b* may be tailored to client device 120*a*. The response packet is then sent from web server 130*b* towards client device 120*a* with a destination address indicating the address of client device 120*a* and a source address indicating the physical address for web server 130*b*.

When the response packet is received at leaf switch 115*c*, the PBR policies distributed by controller 140 are triggered. Specifically, the PBR policies distributed to leaf switch 115*c* indicate that the packet should be forwarded to load balancing service appliance 125*a*. According to some specific example embodiments, the policy is triggered when a response packet is received at a leaf switch directly from an application server. When this condition is met, the PBR policy indicates that the packet should be forwarded to leaf switch 115*b* that serves as a gateway for service appliance 125*a* as opposed to leaf switch 115*a* to which client device 120*a* is attached. Upon receipt of the packet at leaf switch 115*b*, another PBR policy indicates that the packet should be forwarded to service appliance 125*a* even though the destination address indicates an address for client device 120*a*. This PBR policy on leaf switch 115*b* is typically applied on the core-facing overlay interface. Service appliance 125*a* will perform address translation on the response packet source address, changing the source address from the physical address of web server 130*b* to the virtual address utilized by all of web servers 130*a-c*. Service appliance 125*a* then sends the response packet towards client device 120*a*. Because the source address for the packet now indicates the same address to which client device 120*a* sent its request packet (i.e., the virtual address shared by web servers 130*a-c*), client device 120*a* may determine that the response packet is, in fact, the packet sent in response to its request packet.

In the above-described process, the PBR policies are distributed to the leaf switches via which the application servers (e.g., web servers) access network 105 (i.e., leaf switch 115*c*) and to the leaf switches via which the service appliances access network 105 (i.e., leaf switch 115*b*). These policies may be generated automatically and/or semi-automatically. According to the semi-automatic process, the PBR policies may be generated and distributed according to the following process.

1. A network administrator defines an auto-configuration profile in a network management console, such as the network management console 150 shown in FIG. 1 that has connectivity to the controller 140, for example. A Virtual Internet Protocol (VIP) address for a service, along with the Transmission Control Protocol/User Datagram (TCP/UDP) port number is also specified in the profile. The profile may also contain the Internet Protocol (IP) addresses of real servers, mapped to the VIP address. The physical IP addresses may take the form of an IP address prefix. Accordingly, the profile would map the virtual address shared by web servers 130*a-c* to the respective physical addresses for web servers 130*a-c*. The network administrator has a choice to either configure host prefixes per each of the real servers or specify a subnet prefix, where only real servers will reside.

2. The network management console 150 stores the auto-configuration profile in, for example, a Lightweight Directory Access Protocol (LDAP) database, and makes the database available for access by auto-configuration features of the leaf switches 115*a-c*.

3. The VIP addresses, physical IP address and TCP/UDP port numbers are used to create the Access Control List (ACL), route-map and PBR policies by the leaf switches 115*a-c*, which facilitate the traffic redirection described above.

4. The leaf switches 115*a-c* detects web servers 130*a-c* and service appliances 125*a* and 125*c* using, for example, Media Access Control (MAC) detect or Virtual Station Interface Discovery and Configuration Protocol (VDP) triggers, among other technologies.

5. The route-map is applied on the overlay technology interface (for example, an SVI for Virtual Local Area Networks (VLAN), or in case of VXLAN encapsulation on the BDI where real servers are connected. In other words, the route-map is applied to the default gateway SVI or BDI of the real servers, in this case, leaf switch 115*c*. This effectively redirects qualified traffic from real servers to the VIP address, causing traffic received from webservers 130*a-c* to be redirected to leaf switch 115*b*.

6. On a per-Virtual Routing and Forwarding (VRF) basis the route-map for PBR policy is applied on the fabric facing core interface. This PBR policy needs to be applied only on the leaf switches attached to the service appliances. The PBR policy is applied on all leaf nodes on the host facing interfaces that are attached to the servers that are servicing that particular virtual address. In other words, the gateway that serves as the gateway for load balancing service appliance 125a is configured to forward response packets addressed to a client device 120a to the load balancing service appliance 125a.

With these policies in place, the ACL generated by the leaf switches 115a-c matches data traffic coming from source IP addresses with the physical address of web servers 130a-c from the TCP/UDP port associated with these physical addresses. In other words, the leaf switch via which web servers 130a-c access network 105 determines when response traffic is being received directly from web servers 130a-c. The route-map qualifies traffic on an earlier defined ACL, and sets the next-hop IP address to the VIP address. In other words, the route-map qualifies any application response traffic from the physical addresses of web servers 130a, 130b and/or 130c to be redirected to the VIP address, causing the traffic to be redirected to load balancing service appliance 125a even though the packet is configured with a destination address for client device 120a. Once received at service appliance 125a, the source address of the response packet is changed to reflect the virtual address to which the initial request packet was set by client device 120a, and the response is forwarded to client device 120a.

The fully automatic process may, for example, utilize an orchestrator 160, which may automate functions otherwise carried out by a network administrator via the controller 140 and management console 150. The automatic process may proceed according to the following process.

1. The virtual service (e.g., VXLAN, etc.) is configured in an orchestrator.

2. The orchestrator pushes VIP addresses and real server configuration, including the physical addresses therefore, to the service appliance, e.g., a load-balancer.

3. The orchestrator pushes network and partition profile definitions to the network management console.

4. Configuration parsing, auto-configuration and dynamic configuration instantiation on fabric leaf nodes proceeds as described above with reference to the semi-automatic process.

With reference now made to FIG. 2, depicted therein is a specific configuration 200 of a leaf switch, such as leaf switches 115a-c of FIG. 1, that is configured to carry out the packet forwarding as described above with reference to FIG. 1. According to the example embodiment of FIG. 2, the application servers physically reside in subnet "192.168.10.0/24," the application service is HTTP, i.e. TCP port 80, and these application servers share a virtual service with VIP address "100.100.100.100." As shown through instructions 205, the PBR illustrated in FIG. 2 applies to HTTP traffic received from devices physically resident in subnet "192.168.10.0/24." Instruction 210 indicates that when received at the gateway device servicing subnet "192.168.10.0/24," the next hop for the packet should be set to "100.100.100.100." In other words, when received at the gateway servicing the application servers, the packet is forwarded to the leaf switch that serves as the gateway for the service appliance. This same instruction causes the leaf switch that serves as a gateway for the service appliance to forward the response packet to the service appliance. Instructions 215 and 220 indicate which leaf switches should apply this configuration. Specifically, instruction 215 indicates that the gateway devices (e.g., leaf switches) servicing the application servers apply this configuration. The policy associated with instruction 215 is applied on traffic received on the underlying interface where the application servers are attached to the physical network. In other words, the policy associated with instruction 215 is applied at the application server-facing interface. Instruction 220 indicates that the gateway devices (e.g., leaf switches) servicing the service appliance should also apply the configuration. In other words, instruction 220 indicates that the policy associated with instruction 220 is applied on the fabric facing core interface, i.e., the instructions are applied in response to packets received from application servers addressed to client applications being redirected to the service appliance, and the instructions are applied at the interface of the leaf switch facing the spine switches.

Figure 3:
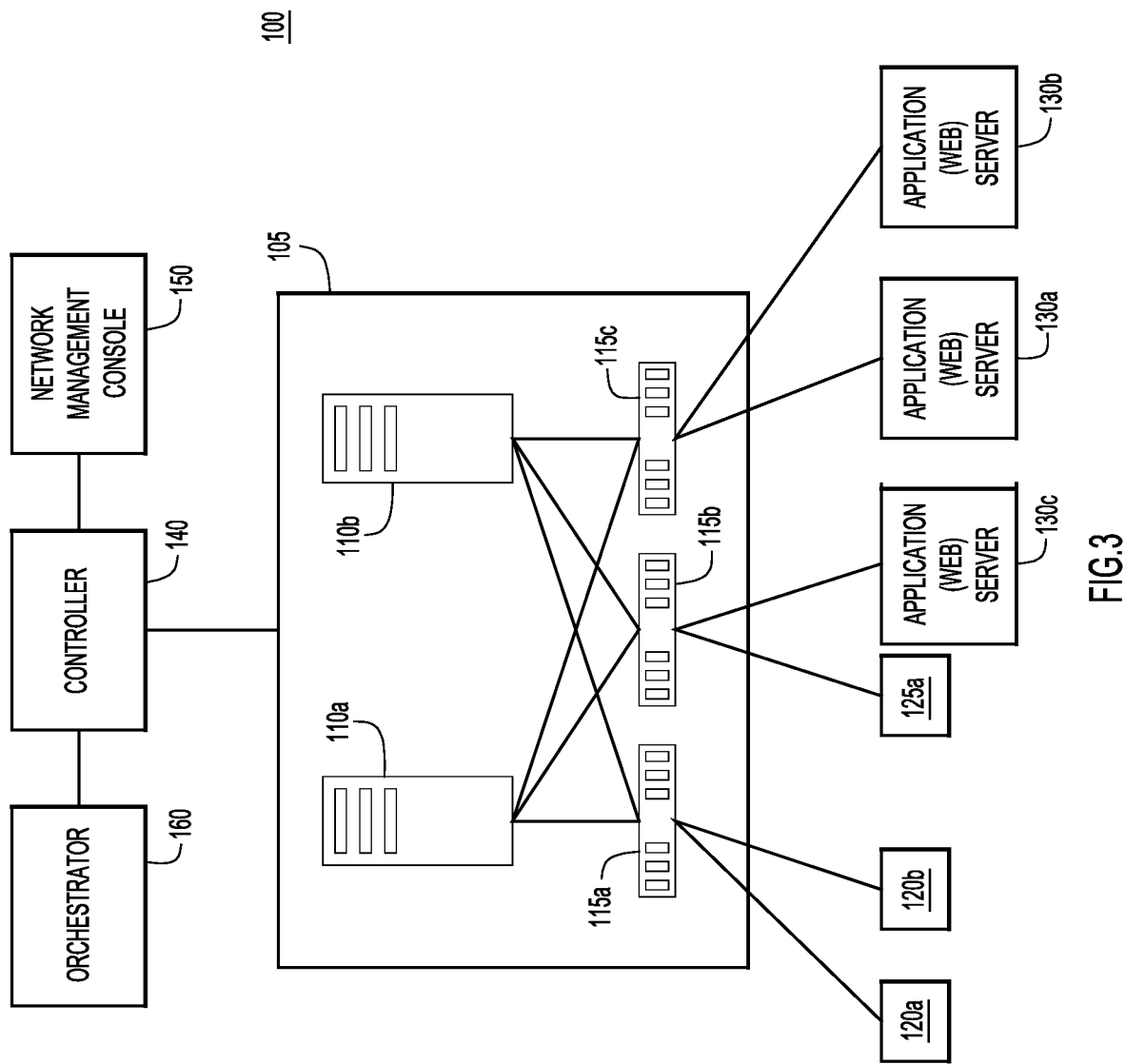
FIG. 3 illustrates a second example network environment implementing a logical or virtual overlay that integrates service appliances without source network address translation, according to an example embodiment.

With reference now made to FIG. 3, depicted therein is network environment 100 of FIG. 1, but with one change: web server 130c has been moved from accessing network 105 through leaf switch 115c to accessing network 105 through leaf switch 115b. This embodiment operates in the same manner as that of FIG. 1, illustrating how the present techniques are applicable regardless of where within the distributed gateway the application servers 130a-c access network 105. For example, if a request packet is sent from client device 120a, this packet will be forwarded to load balancing service appliance 125a as a result of the virtual address to which the request packet is addressed. If load balancing service appliance 125a decides to forward the packet to web server 130a or 130b, the request packet and the response packet will follow the process and path as described above with reference to FIG. 1. On the other hand, if load balancing service appliance 125a forwards the request packet to web server 130c, the load balancing service appliance 125a will perform address translation on the packet so that its destination address is now the physical address for web server 130c. The translated packet will be sent back to leaf switch 115b, which then forwards the packet to web server 130c. Web server 130c will prepare a response packet which will be sent to leaf switch 115b. Just like leaf switch 115c, leaf switch 115b is configured to apply PBR to response packets received from web server 130c, and forward the response packet to leaf switch 115b.

Upon receipt at leaf switch 115b, the PBR policies implemented by leaf switch 115b forward the response packet to service appliance 125a. Service appliance 125a will then translate the source address of the packet to the virtual address associated with web servers 130a-c, and forward the packet to client device 120a. In other words, so long as each of the leaf switches 115a-c that services an application server (which in the example embodiment of FIG. 3 are leaf switches 115b and 115c) is appropriately configured, and the leaf switch servicing the service appliance is appropriately configured, the techniques described herein may be accurately applied to network environments that implement logical overlays with distributed gateways.

Figure 4:
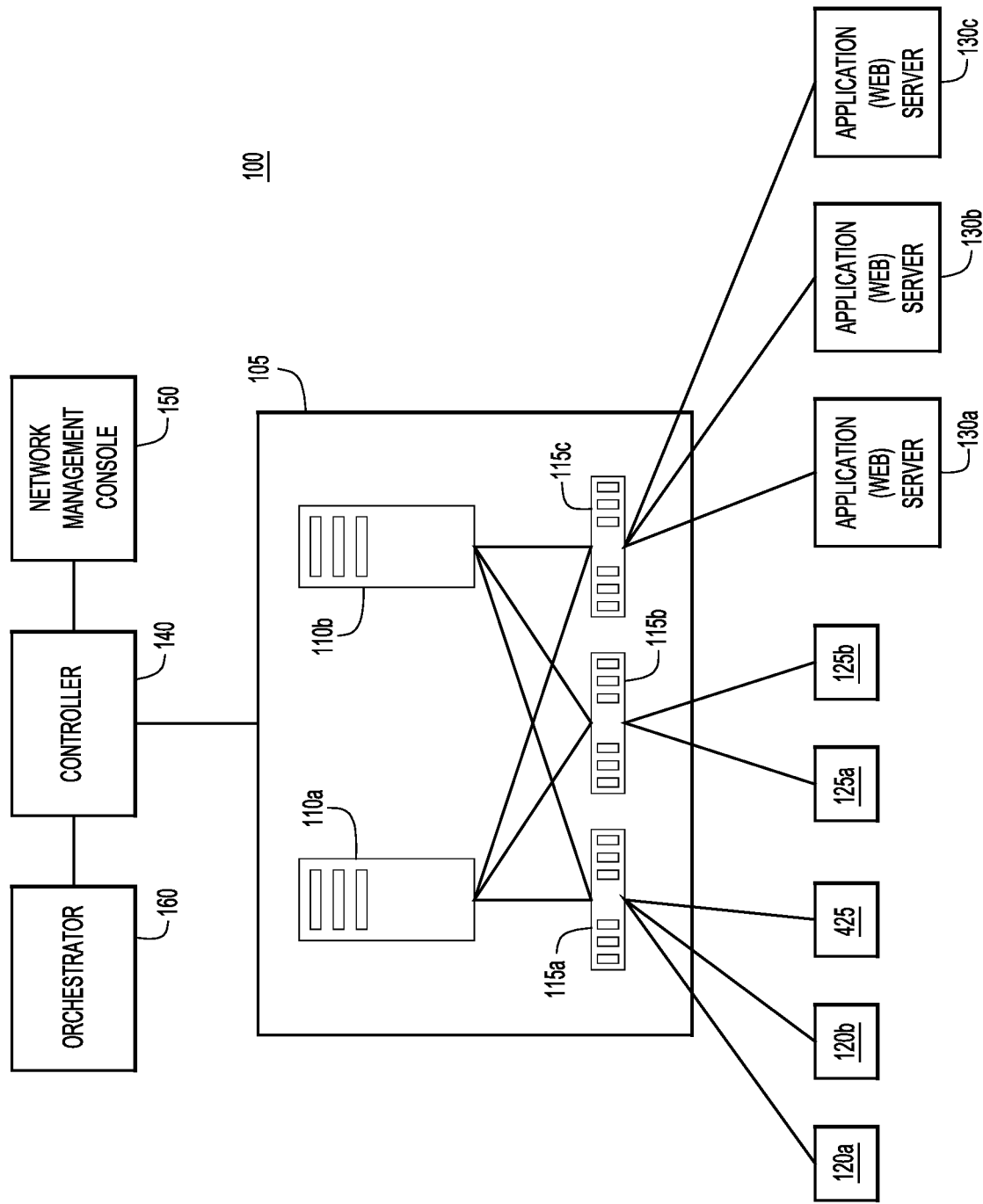
FIG. 4 illustrates a third example network environment implementing a logical or virtual overlay that integrates service appliances without source network address translation, according to an example embodiment.

With reference now made to FIG. 4, depicted therein is network environment 100 of FIG. 1, but with one change: an additional load balancing service appliance 425 has been added which accesses network environment 105 through leaf switch 115a. Both load balancing appliance 125a and load balancing appliance 425 are associated with the virtual address to which a request packet sent from client device 120a to one of web servers 130b or 130c will be addressed. Accordingly, the request packet may be processed by either of load balancing appliance 125a or load balancing appliance 425. Nevertheless, if leaf switches 115a-c are configured as described herein, the techniques will appropriately process both the request packet sent by client device 120a and the response packet sent by web server 130b.

For example, the request packet of the present example is received by load balancing service appliance 125a, which sends the packet to web server 130b. Web server 130b processes the request and sends a response packet addressed to client device 120a with the physical address for web server 130b indicated as the source address for the response packet. This response packet is received at leaf switch 115c which forwards the response packet to a leaf switch associated with the virtual address for services applied by web servers 130a-c. This forwarding may resulting in the response packet being forwarded to either of load balancing service appliance 125a or load balancing service appliance 425 (the assumption is that the two load balancers are setup as a cluster and hence their state is synchronized). If the packet is forwarded to load balancing service appliance 125a, the packet will follow the same process and route as described above with reference to FIG. 1. Similarly, if the response packet is forwarded to load balancing service appliance 425, the load balancing service appliance 425 will perform address translation, translating the source address from the physical address of web server 130b to the virtual address to which the request packet was addressed. Load balancing service appliance 425 will then forward the packet to client device 120a.

Figure 5:
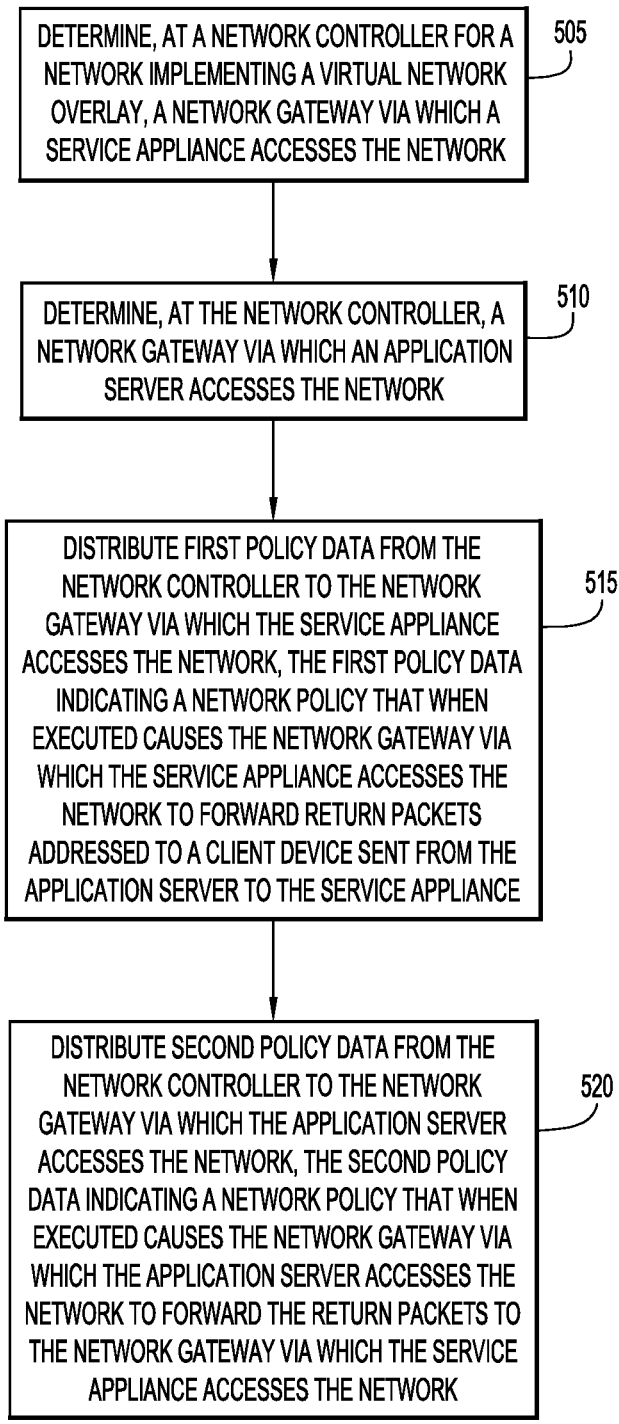
FIG. 5 is a flowchart illustrating a process for integrating service appliances into network environments implementing logical or virtual overlays without source network address translation, according to an example embodiment.

With reference now made to FIG. 5, depicted therein is a flowchart 500 illustrating a process for implementing the techniques described herein. The processing begins in operation 505 in which a network controller for a network implementing a virtual network overlay determines a network gateway via which a service appliance accesses the network. For example, a controller like controller 140 of FIG. 1 may determine that a service appliance like service appliance 125a accesses a network with a virtual network overlay through a first leaf switch, such as leaf switch 115b of FIG. 1. Operation 505 may also determine a plurality of gateways via which a plurality of service appliances access the network, as illustrated in FIG. 4.

In operation 510, the network controller determines a network gateway via which an application server accesses the network. For example, a controller like controller 140 of FIG. 1 may determine that an application server, like web server 130b of FIG. 1, accesses the network through a second leaf switch, such as leaf switch 115c of FIG. 1. According to other example embodiments, the network gateway via which the application server accesses the network may be the network gateway via which the service appliance accesses the network, as illustrated in FIG. 3. Operation 510 may also determine a plurality of gateways via which a plurality of application servers access the network, as illustrated in FIG. 3.

In operation 515, the network controller distributes first policy data to the network gateway via which the service appliance accesses the network. This first policy data indicates a network policy such that when the policy is executed, the network gateway via which the service appliance accesses the network is configured to forward return packets addressed to a client device sent from an application server to the service appliance. In other words, according to example embodiments, operation 515 configures a network gateway, such as a leaf switch, to process application server response packets in the manner described above with regard to the leaf switches that serve as gateways for service appliance 125a of FIGS. 1 and 2 and service appliance 425 of FIG. 4. Operation 515 may also distribute the first policy data to a plurality of gateways via which a plurality of service appliances access the network, as illustrated in FIG. 4.

In operation 520, the network controller distributes second policy data to the network gateway via which the application server accesses the network. This second policy data indicates a network policy such that when the policy is executed, the network gateway via which the application server accesses the network is configured to forward return packets addressed to the client device sent from the application server to the network gateway via which the service appliance accesses the network. According to some example embodiments, the first policy data and second policy data comprise the same data. According to example embodiments, operation 520 configures a network gateway, such as a leaf switch, as illustrated in FIG. 2. Operation 520 may also distribute the second policy data to a plurality of gateways via which a plurality of application servers access the network, as illustrated in FIG. 3.

Figure 6:
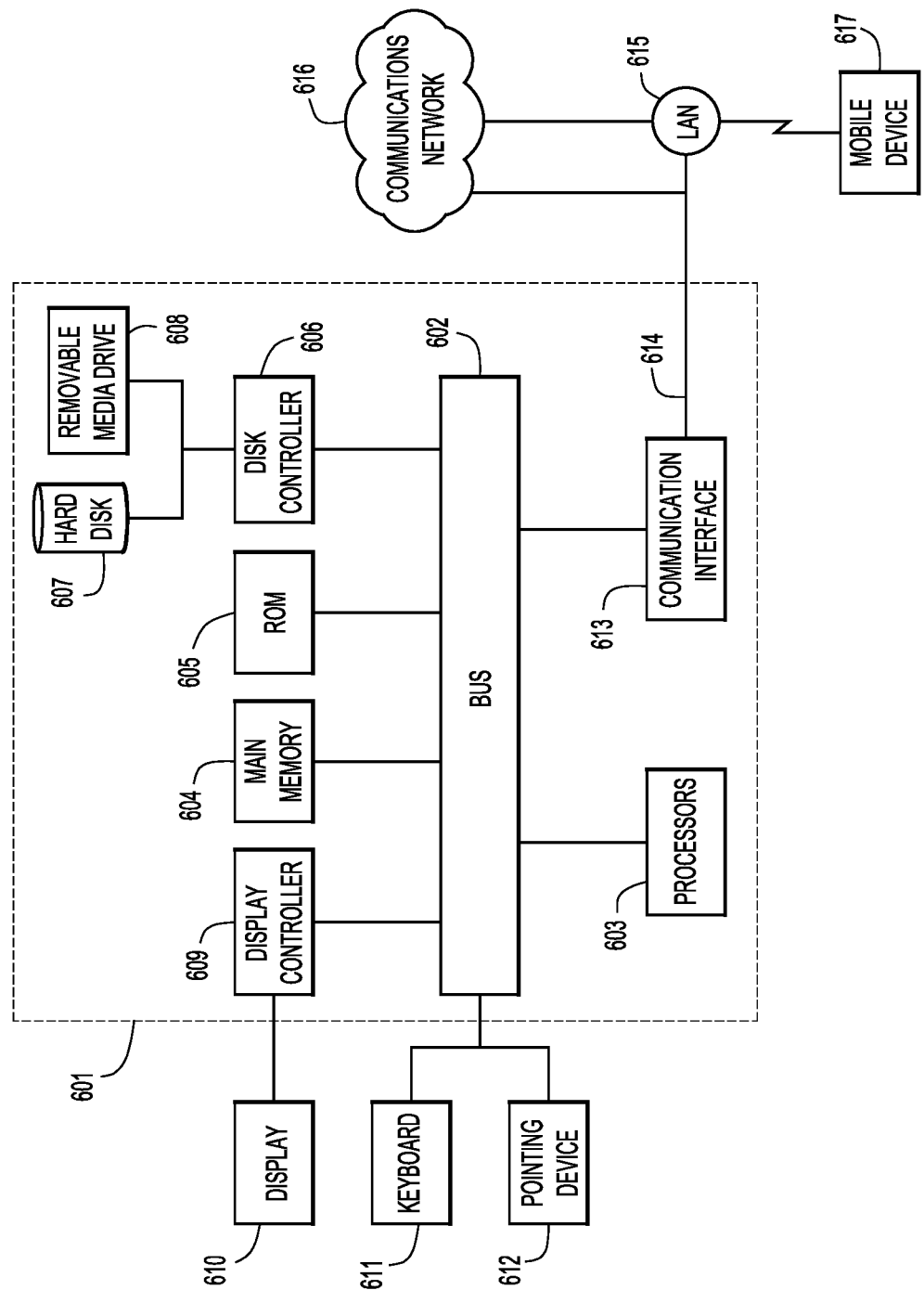
FIG. 6 is a block diagram of a network device configured to integrate service appliances into network environments implementing logical or virtual overlays without source network address translation, according to an example embodiment.

FIG. 6 illustrates a computer system 601 upon which the embodiments presented may be implemented. The computer system 601 may be programmed to implement a computer based device, such as a network controller, leaf switch, spine switch, service appliance, or application server as described above with reference to FIGS. 1-5. The computer system 601 includes a bus 602 or other communication mechanism for communicating information, and a processor 603 coupled with the bus 602 for processing the information. While the figure shows a single block 603 for a processor, it should be understood that the processors 603 represent a plurality of processing cores, each of which can perform separate processing. The computer system 601 also includes a main memory 604, such as a random access memory (RAM) or other dynamic storage device (e.g., dynamic RAM (DRAM), static RAM (SRAM), and synchronous DRAM (SD RAM)), coupled to the bus 602 for storing information and instructions to be executed by processor 603. In addition, the main memory 604 may be used for storing temporary variables or other intermediate information during the execution of instructions by the processor 603.

The computer system 601 further includes a read only memory (ROM) 605 or other static storage device (e.g., programmable ROM (PROM), erasable PROM (EPROM), and electrically erasable PROM (EEPROM)) coupled to the bus 602 for storing static information and instructions for the processor 603.

The computer system 601 also includes a disk controller 606 coupled to the bus 602 to control one or more storage devices for storing information and instructions, such as a magnetic hard disk 607, and a removable media drive 608 (e.g., floppy disk drive, read-only compact disc drive, read/write compact disc drive, compact disc jukebox, tape drive, and removable magneto-optical drive). The storage devices may be added to the computer system 601 using an appropriate device interface (e.g., small computer system interface (SCSI), integrated device electronics (IDE), enhanced-IDE (E-IDE), direct memory access (DMA), or ultra-DMA).

The computer system 601 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, are types of processing circuitry. The processing circuitry may be located in one device or distributed across multiple devices.

The computer system 601 may also include a display controller 609 coupled to the bus 602 to control a display 610, such as a cathode ray tube (CRT), Liquid Crystal Display (LCD) or other now known or hereinafter developed display technologies, for displaying information to a computer user. The computer system 601 may include input devices, such as a keyboard 611 and a pointing device 612, for interacting with a computer user and providing information to the processor 603. The pointing device 612, for example, may be a mouse, a trackball, or a pointing stick for communicating direction information and command selections to the processor 603 and for controlling cursor movement on the display 610. In addition, a printer may provide printed listings of data stored and/or generated by the computer system 601.

The computer system 601 performs a portion or all of the processing steps of the process in response to the processor 603 executing one or more sequences of one or more instructions contained in a memory, such as the main memory 604. Such instructions may be read into the main memory 604 from another computer readable medium, such as a hard disk 607 or a removable media drive 608. One or more processors in a multi-processing arrangement may also be employed to execute the sequences of instructions contained in main memory 604. In alternative embodiments, hard-wired circuitry may be used in place of or in combination with software instructions. Thus, embodiments are not limited to any specific combination of hardware circuitry and software.

As stated above, the computer system 601 includes at least one computer readable medium or memory for holding instructions programmed according to the embodiments presented, for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM), or any other optical medium, punch cards, paper tape, or other physical medium with patterns of holes, or any other medium from which a computer can read.

Stored on any one or on a combination of non-transitory computer readable storage media, embodiments presented herein include software for controlling the computer system 601, for driving a device or devices for implementing the process, and for enabling the computer system 601 to interact with a human user (e.g., print production personnel). Such software may include, but is not limited to, device drivers, operating systems, development tools, and applications software. Such computer readable storage media further includes a computer program product for performing all or a portion (if processing is distributed) of the processing presented herein.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The computer system 601 also includes a communication interface 613 coupled to the bus 602. The communication interface 613 provides a two-way data communication coupling to a network link 614 that is connected to, for example, a local area network (LAN) 615, or to another communications network 616 such as the Internet. For example, the communication interface 613 may be a wired or wireless network interface card to attach to any packet switched (wired or wireless) LAN. As another example, the communication interface 613 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 613 sends and receives electrical, electromagnetic or optical signals that carry digital data streams representing various types of information.

The network link 614 typically provides data communication through one or more networks to other data devices. For example, the network link 614 may provide a connection to another computer through a local area network 615 (e.g., a LAN) or through equipment operated by a service provider, which provides communication services through a communications network 616. The local network 614 and the communications network 616 use, for example, electrical, electromagnetic, or optical signals that carry digital data streams, and the associated physical layer (e.g., CAT 5 cable, coaxial cable, optical fiber, etc.). The signals through the various networks and the signals on the network link 614 and through the communication interface 613, which carry the digital data to and from the computer system 601 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 601 can transmit and receive data, including program code, through the network(s) 615 and 616, the network link 614 and the communication interface 613. Moreover, the network link 614 may provide a connection through a LAN 615 to a mobile device 617 such as a personal digital assistant (PDA) laptop computer, or cellular telephone.

In summary, provided for herein are techniques that enhance the functionality in standalone fabric networks with FabricPath or VXLAN encapsulation, by allowing the application delivery controllers and load-balancers to retain end-clients visibility. This functionality allows for such systems to satisfy compliance regulations while simplifying application deployment methods. The techniques described herein allow the fabric networks with FabricPath or VXLAN encapsulation to utilize the latest enhancements in data forwarding models within the fabric networks and across multiple fabric networks, while facilitating the end-client transparency at the application service level. That is, with these techniques in place, an application delivery controller or a load-balancer may be deployed in a simple single-arm mode without SNAT, and thus retain the end-client identity (source IP address) in the IP packet header. At the same time, having these techniques deployed in fabric networks facilitates enhanced data forwarding capabilities.

In comparison, other techniques, such as application delivery controller deployments with SNAT, obscures the end-client IP address information, and thus prevents the application services from tracking sensitive client information. This drawback renders the application delivery controllers unusable for enterprise-grade applications which require the retention of such sensitive information.

The techniques described herein may also be compared against application delivery controllers deployed as a default gateway for application servers. Such a deployment model is very simple, but also completely erases all benefits and enhancements of the data forwarding methods of fabric networks with FabricPath or VXLAN encapsulation. The techniques describe herein retain end-client transparency while allowing the fabric networks to implement the benefits and enhancements of the data forwarding methods of fabric networks with FabricPath or VXLAN encapsulation.

Accordingly, in one form, the techniques described here are provided as a method comprising: determining, at a network controller for a network implementing a virtual network overlay, a network gateway via which a service appliance accesses the network; determining, at the network controller, a network gateway via which an application server accesses the network; distributing first policy data from the network controller to the network gateway via which the service appliance accesses the network, the first policy data indicating a network policy that when executed causes the network gateway via which the service appliance accesses the network to forward return packets addressed to a client device sent from the application server to the service appliance; and distributing second policy data from the network controller to the network gateway via which the application server accesses the network, the second policy data indicating a network policy that when executed causes the network gateway via which the application server accesses the network to forward the return packets to the network gateway via which a service appliance accesses the network.

In another form, an apparatus is provided comprising: a network interface configured to communicate over a network implementing a virtual network overlay; and one or more processors, wherein the one or more processors are configured to: determine a network gateway via which a service appliance accesses the network; determine a network gateway via which an application server accesses the network; distribute, via the network interface, first policy data from the apparatus to the network gateway via which the service appliance accesses the network, the first policy data indicating a network policy that when executed causes the network gateway via which the service appliance accesses the network to forward return packets addressed to a client device sent from the application server to the service appliance; and distribute, via the network interface, second policy data from the apparatus to the network gateway via which the application server accesses the network, the second policy data indicating a network policy that when executed causes the network gateway via which the application server accesses the network to forward the return packets to the network gateway via which a service appliance accesses the network.

In still another form, a tangible, non-transitory computer readable storage medium encoded with instructions is provide. The instructions, when executed, are operable to: determine, at a network controller for a network implementing a virtual network overlay, a network gateway via which a service appliance accesses the network; determine, at the network controller, a network gateway via which an application server accesses the network; distribute first policy data from the network controller to the network gateway via which the service appliance accesses the network, the first policy data indicating a network policy that when executed causes the network gateway via which the service appliance accesses the network to forward return packets addressed to a client device sent from the application server to the service appliance; and distribute second policy data from the network controller to the network gateway via which the application server accesses the network, the second policy data indicating a network policy that when executed causes the network gateway via which the application server accesses the network to forward the return packets to the network gateway via which a service appliance accesses the network.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   determining, at a network controller for a network implementing a virtual network overlay, a network gateway via which a stateful service appliance accesses the network;
   determining, at the network controller, a network gateway via which an application server accesses the network;
   distributing first policy data from the network controller to the network gateway via which the stateful service appliance accesses the network, the first policy data indicating a network policy that when executed causes the network gateway via which the stateful service appliance accesses the network to forward return packets addressed to a client device sent from the application server to the stateful service appliance; and
   distributing second policy data from the network controller to the network gateway via which the application server accesses the network, the second policy data indicating a network policy that when executed causes the network gateway via which the application server accesses the network to forward the return packets to the network gateway via which the stateful service appliance accesses the network,
   wherein the network gateway via which the application server accesses the network is different from the network gateway via which the stateful service appliance accesses the network,
   wherein the network gateway via which the stateful service appliance accesses the network is different from a network gateway via which the client device accesses the network, and
   wherein the network gateway via which the application server accesses the network and the network gateway via which the stateful service appliance accesses the network comprise a distributed network gateway that implements the virtual network overlay.

2. The method of claim 1, wherein the stateful service appliance comprises a load balancer.

3. The method of claim 1, wherein
   the stateful service appliance comprises a first service appliance of a plurality of service appliances.

4. The method of claim 3, wherein distributing the first policy data from the network controller to the network gateway via which the stateful service appliance accesses the network comprises distributing the first policy data to each gateway of the distributed network gateway via which each of the plurality of service appliances accesses the network.

5. The method of claim 1, wherein the application server is one of a plurality of application servers, wherein each of the plurality of application servers provides a same application functionality; and wherein distributing the second policy data from the network controller to the network gateway via which the application server accesses the network comprises distributing the second policy data to each network gateway via which one or more of the plurality of applications servers access the network.

6. The method of claim 1, wherein the network gateway via which the stateful service appliance accesses the network and the network gateway via which the application server accesses the network are different leaf switches.

7. The method of claim 1, wherein the return packets comprise a response to an application service request from the client device.

8. An apparatus comprising:
a network interface configured to communicate over a network implementing a virtual network overlay; and
one or more processors, wherein the one or more processors are configured to:
determine a network gateway via which a stateful service appliance accesses the network;
determine a network gateway via which an application server accesses the network;
distribute, via the network interface, first policy data from the apparatus to the network gateway via which the stateful service appliance accesses the network, the first policy data indicating a network policy that when executed causes the network gateway via which the stateful service appliance accesses the network to forward return packets addressed to a client device sent from the application server to the stateful service appliance; and
distribute, via the network interface, second policy data from the apparatus to the network gateway via which the application server accesses the network, the second policy data indicating a network policy that when executed causes the network gateway via which the application server accesses the network to forward the return packets to the network gateway via which the stateful service appliance accesses the network,
wherein the network gateway via which the application server accesses the network is different from the network gateway via which the stateful service appliance accesses the network,
wherein the network gateway via which the stateful service appliance accesses the network is different from a network gateway via which the client device accesses the network, and
wherein the network gateway via which the application server accesses the network and the network gateway via which the stateful service appliance accesses the network comprise a distributed network gateway that implements the virtual network overlay.

9. The apparatus of claim 8, wherein the stateful service appliance comprises a load balancer.

10. The apparatus of claim 8, wherein
the stateful service appliance comprises a first service appliance of a plurality of service appliances.

11. The apparatus of claim 10, wherein the one or more processors are further configured to distribute the first policy data from the apparatus to the network gateway via which the stateful service appliance accesses the network by distributing the first policy data to each gateway of the distributed network gateway via which each of the plurality of service appliances accesses the network.

12. The apparatus of claim 8, wherein the application server is one of a plurality of application servers, wherein each of the plurality of application servers provides a same application functionality; and
wherein the one or more processors are further configured to distribute the second policy data from the apparatus to the network gateway via which the application server accesses the network by distributing the second policy data to each network gateway via which one or more of the plurality of applications servers access the network.

13. The apparatus of claim 8, wherein the network gateway via which the stateful service appliance accesses the network and the network gateway via which the application server accesses the network are different leaf switches.

14. The apparatus of claim 8, wherein the return packets comprise a response to an application service request from the client device.

15. A non-transitory computer readable storage medium encoded with instructions, wherein the instructions, when executed by a processor, cause the processor to:
determine, at a network controller for a network implementing a virtual network overlay, a network gateway via which a stateful service appliance accesses the network;
determine, at the network controller, a network gateway via which an application server accesses the network;
distribute first policy data from the network controller to the network gateway via which the stateful service appliance accesses the network, the first policy data indicating a network policy that when executed causes the network gateway via which the stateful service appliance accesses the network to forward return packets addressed to a client device sent from the application server to the stateful service appliance; and
distribute second policy data from the network controller to the network gateway via which the application server accesses the network, the second policy data indicating a network policy that when executed causes the network gateway via which the application server accesses the network to forward the return packets to the network gateway via which the stateful service appliance accesses the network,
wherein the network gateway via which the application server accesses the network is different from the network gateway via which the stateful service appliance accesses the network,
wherein the network gateway via which the stateful service appliance accesses the network is different from a network gateway via which the client device accesses the network, and
wherein the network gateway via which the application server accesses the network and the network gateway via which the stateful service appliance accesses the network comprise a distributed network gateway that implements the virtual network overlay.

16. The non-transitory computer readable storage medium of claim 15, wherein the stateful service appliance comprises a load balancer.

17. The non-transitory computer readable storage medium of claim 15, wherein
the stateful service appliance comprises a first service appliance of a plurality of service appliances.

18. The non-transitory computer readable storage medium of claim 17, wherein the instructions that cause the processor to distribute the first policy data from the network controller to the network gateway via which the stateful service appliance accesses the network further cause the processor to distribute the first policy data to each gateway of the distributed network gateway via which each of the plurality of service appliance accesses the network.

19. The non-transitory computer readable storage medium of claim 15, wherein the application server is one of a plurality of application servers, wherein each of the plurality of application servers provides a same application functionality; and wherein the instructions that cause the processor to distribute the second policy data from the network controller to the network gateway via which the application server accesses the network further cause the processor to distribute the second policy data to each network gateway via which one or more of the plurality of applications servers access the network.

20. The non-transitory computer readable storage medium of claim 15, wherein the network gateway via which the stateful service appliance accesses the network and the network gateway via which the application server accesses the network are different leaf switches.

* * * * *